United States Patent
Ramanath et al.

(10) Patent No.: US 6,755,729 B2
(45) Date of Patent: Jun. 29, 2004

(54) POROUS ABRASIVE TOOL AND METHOD FOR MAKING THE SAME

(75) Inventors: Srinivasan Ramanath, Holden, MA (US); Sergej-Tomislav Buljan, Acton, MA (US); Jason R. Wilson, Ayer, MA (US); Jeri Ann S. Ikeda, Framingham, MA (US)

(73) Assignee: Saint-Cobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 10/465,054

(22) Filed: Jun. 18, 2003

(65) Prior Publication Data

US 2003/0232586 A1 Dec. 18, 2003

Related U.S. Application Data

(62) Division of application No. 09/990,647, filed on Nov. 21, 2001, now Pat. No. 6,685,755.

(51) Int. Cl.[7] .............................................. B23F 21/03
(52) U.S. Cl. ..................... 451/541; 451/544; 451/546
(58) Field of Search .......................... 451/28, 541, 540, 451/544–546, 547, 901

(56) References Cited

U.S. PATENT DOCUMENTS

| | | | |
|---|---|---|---|
| 5,203,886 A | | 4/1993 | Sheldon et al. |
| 5,221,294 A | | 6/1993 | Carman et al. |
| 5,429,648 A | | 7/1995 | Wu |
| 5,738,696 A | | 4/1998 | Wu |
| 5,738,697 A | | 4/1998 | Wu et al. |
| 5,827,337 A | | 10/1998 | Keil |
| 5,891,206 A | * | 4/1999 | Ellingson ..................... 51/309 |
| 6,019,668 A | * | 2/2000 | Ramanath et al. ............ 451/41 |
| 6,074,278 A | * | 6/2000 | Wu et al. ..................... 451/28 |
| 6,093,092 A | | 7/2000 | Ramanath et al. |
| 6,102,789 A | | 8/2000 | Ramanath et al. |

FOREIGN PATENT DOCUMENTS

| | | |
|---|---|---|
| JP | 60-118-469 | 6/1985 |
| JP | 3161273 | 7/1991 |
| JP | 3281174 | 12/1991 |
| RU | SU-1227441 | 7/1985 |
| WO | WO 00/73023 | 12/2000 |

* cited by examiner

Primary Examiner—Eileen P. Morgan
(74) Attorney, Agent, or Firm—Mary E. Porter

(57) ABSTRACT

An abrasive article including from about 40 to about 80 volume percent interconnected porosity, the article being useful as a segment for a segmented grinding wheel, and a method for fabricating the same. The method includes blending a mixture of abrasive grain, bond material and dispersoid particles, the mixture including from about 40 to about 80 volume percent dispersoid particles. In one embodiment the mixture includes from about 50 to about 80 volume percent dispersoid particles. In another embodiment the mixture includes an organic bond material and from about 40 to about 80 volume percent dispersoid particles. The powder mixture is then pressed into an abrasive laden composite and thermally processed. After cooling the composite is immersed into a solvent, which dissolves substantially all of the dispersoid particles, leaving a highly porous, bonded abrasive article.

37 Claims, 2 Drawing Sheets

POROUS ABRASIVE TOOL AND METHOD FOR MAKING THE SAME

This is a divisional of U.S. Pat. No. 6,685,755, Ser. No. 09/990,647 filed Nov. 21, 2001.

BACKGROUND OF THE INVENTION (1) Field of the Invention

The present invention relates generally to abrasives and abrasive tools suitable for surface grinding and polishing of hard and/or brittle materials. This invention more particularly relates to highly porous, bonded abrasive articles having an interconnected pore structure and methods for making same. The abrasives of this invention are useful in high performance grinding operations, such as backgrinding silicon, alumina titanium carbide and silicon carbide wafers, which are typically used in the manufacture of electronic components.

(2) Background Information

The use of porous abrasives to improve mechanical grinding processes is generally well known. Pores typically provide access to grinding fluids, such as coolants and lubricants, which tend to promote more efficient cutting, minimize metallurgical damage (e.g., surface burn), and maximize tool life. Pores also permit the clearance of material (e.g., chips or swarf) removed from an object being ground, which is important especially when the object being ground is relatively soft or when surface finish requirements are demanding (e.g., when backgrinding silicon wafers).

Previous attempts to fabricate abrasive articles and/or tools including porosity may generally be classified into one of two categories. In the first category, a pore structure is created by the addition of organic pore inducing media (such as ground walnut shells) into the abrasive article. These media thermally decompose upon firing, leaving voids or pores in the cured abrasive tool. Examples of this category are U.S. Pat. No. 5,221,294 to Carmen, et al., and U.S. Pat. No. 5,429,648 to Wu, and Japan Patents A-91-161273 to Grotoh, et al., A-91-281174 to Satoh, et al. In the second category, a pore structure may be created by the addition of closed cell materials, such as bubble alumina, into an abrasive article. See for example U.S. Pat. No. 5,203,886 to Sheldon, et al.

In an alternative approach, Wu et al., in U.S. Pat. Nos. 5,738,696 and 5,738,697, each of which is fully incorporated herein by reference, disclose an abrasive article and method for fabricating the same including fiber-like abrasive grains having a length to diameter aspect ration of at least 5:1. The poor packing characteristics of the elongated abrasive grains resulted in an abrasive article including increased porosity and permeability and suitable for relatively high-performance grinding.

As market demand has grown for precision components in products such as engines, refractory equipment, and electronic devices (e.g., silicon and silicon carbide wafers, magnetic heads, and display windows) the need has grown for improved abrasive tools for fine precision grinding and polishing of ceramics and other relatively hard and/or brittle materials. The abrasive tools known in the art have not proven entirely satisfactory in meeting the above stated needs. Therefore, there exists a need for improved abrasive articles and abrasive tools, and in particular, those including a relatively high degree of porosity.

SUMMARY OF THE INVENTION

One aspect of the present invention includes a method for fabricating an abrasive article. The method includes blending a mixture of abrasive grain, bond material, and dispersoid particles, the mixture including from about 0.5 to about 25 volume percent abrasive grain, from about 19.5 to about 49.5 volume percent bond material, and from about 50 to about 80 volume percent dispersoid particles. The method further includes pressing the mixture into an abrasive laden composite, thermally processing the composite, and immersing the composite into a solvent for a period of time suitable to dissolve substantially all of the dispersoid, the dispersoid being soluble in the solvent. Further, the abrasive grain and the bond material are substantially insoluble in the solvent. In one variation of this aspect, the bond material includes from about 35 to about 85 weight percent copper, from about 15 to about 65 weight percent tin, and from about 0.2 to about 1.0 weight percent phosphorus. In a further variation of this aspect, the dispersoid includes granular sodium chloride and the solvent includes boiling water.

In another aspect, this invention includes an abrasive segment for a segmented grinding wheel. The abrasive segment includes a composite including a plurality of superabrasive grains and a metal bond matrix sintered together at a temperature ranging from about 370 to about 795° C., the composite having a plurality of interconnected pores disposed therein, the composite including from about 0.5 to about 25 volume percent abrasive grain, from about 19.5 to about 49.5 percent metal bond and from about 50 to about 80 volume percent interconnected porosity. The metal bond matrix includes from about 35 to about 70 weight percent copper, from about 30 to about 65 weight percent tin, and from about 0.2 to about 1.0 weight percent phosphorus. The plurality of superabrasive grains is selected from the group consisting of diamond and cubic boron nitride, the superabrasive grains having an average particle size of less than about 300 microns.

In a further aspect, this invention includes a segmented grinding wheel. The grinding wheel includes a core having a minimum specific strength of 2.4 MPa-cm$^3$/g, a core density of 0.5 to 8.0 g/cm$^3$, and a circular perimeter. The grinding wheel further includes an abrasive rim including a plurality of segments, each of the segments including a composite having a plurality of abrasive grains and a metal bond matrix sintered together at a temperature ranging from about 370 to about 795° C., the composite having a plurality of interconnected pores disposed therein, the composite including from about 50 to about 80 volume percent interconnected porosity. The grinding wheel still further includes a thermally stable bond between said core and each of said plurality of segments.

In still a further aspect, this invention includes a method for fabricating an abrasive article having from about 40 to about 80 volume percent interconnected porosity. The method includes blending a mixture of abrasive grain, organic or other non-metallic bond material, and dispersoid particles, the mixture including from about 0.5 to about 25 volume percent abrasive grain, from about 19.5 to about 65 volume percent organic bond material, and from about 40 to about 80 volume percent dispersoid particles. The method further includes pressing the mixture into an abrasive laden composite, thermally processing the composite, immersing the composite into a solvent for a period of time suitable to dissolve substantially all of the dispersoid, the dispersoid being soluble in the solvent. In a variation of this aspect the dispersoid includes granular sugar and the solvent includes boiling water.

In yet another aspect, this invention includes an abrasive segment for a segmented grinding wheel. The abrasive segment includes a composite including a plurality of superabrasive grains and a non-metallic bond matrix cured together, the composite having a plurality of interconnected pores disposed therein and including from about 0.5 to about 25 volume percent abrasive grain, from about 19.5 to about 65 percent non-metallic bond and from about 40 to about 80 volume percent interconnected porosity. The plurality of superabrasive grains are selected from the group consisting of diamond and cubic boron nitride, the plurality of superabrasive grains having an average particle size of less than about 300 microns.

In yet a further aspect, this invention includes a segmented grinding wheel. The grinding wheel includes a core having a minimum specific strength of 2.4 MPa-cm$^3$/g, a core density of 0.5 to 8.0 g/cm$^3$, and a circular perimeter. The grinding wheel further includes an abrasive rim including a plurality of segments, each of the segments including a composite of abrasive grains and a non-metallic bond matrix cured together, the composite having a plurality of interconnected pores disposed therein and including from about 40 to about 80 volume percent interconnected porosity. The grinding wheel still further includes a thermally stable bond between the core and each of the plurality of segments.

DETAILED DESCRIPTION

Figure 1:
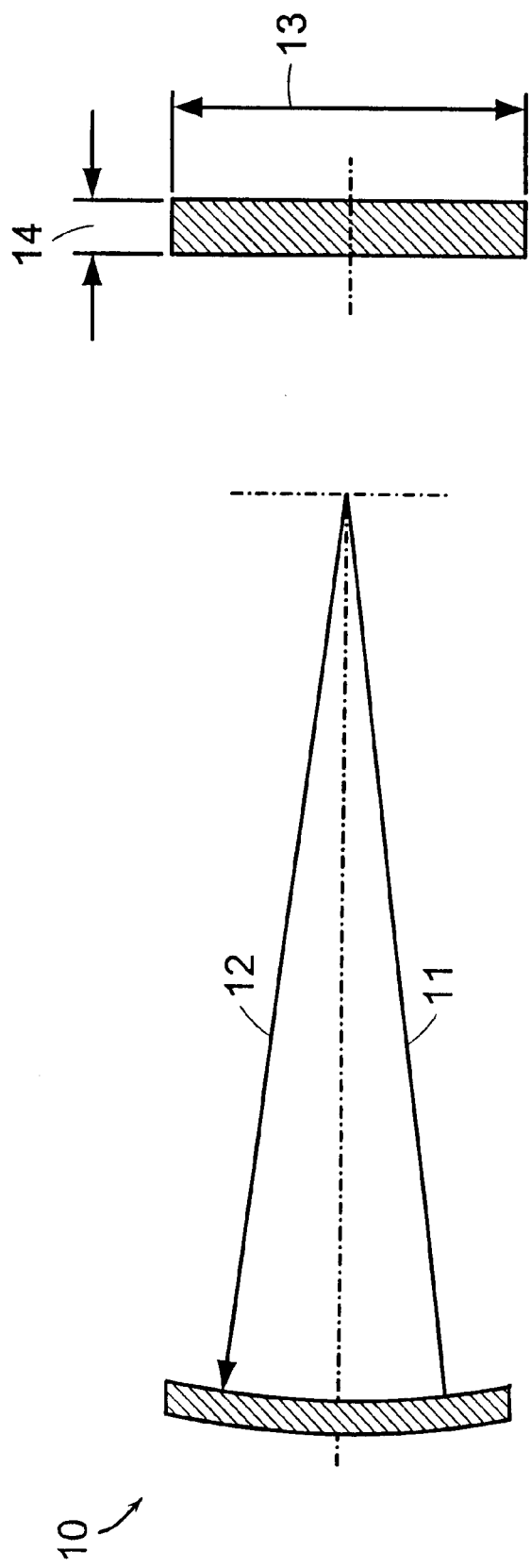
FIG. 1 is a schematic representation of one embodiment of an abrasive segment of this invention.

The present invention includes a porous abrasive article that may be useful in precision grinding, polishing, or cutting applications. One example of the abrasive grinding wheel of the present invention is an abrasive segment 10 for a segmented grinding wheel 100 (see for example FIGS. 1 and 2, which are described in further detail hereinbelow with respect to Example 1). One embodiment of an abrasive article of this invention includes from about 50 to about 80 volume percent interconnected porosity. Another embodiment of an abrasive article of this invention includes a non-metallic bond, such as an organic bond material (e.g., phenolic resin) and includes from about 40 to about 80 volume percent interconnected porosity. This invention also includes a method for fabricating porous abrasive articles. Grinding wheels (e.g., grinding wheel 100) including one or more of the abrasive articles (e.g., segment 10) of this invention are potentially advantageous for mirror finish grinding of hard and/or brittle materials, such as silicon wafers, silicon carbide, alumina titanium carbide, and the like. These grinding wheels may be further advantageous in that they may eliminate the need for dressing (or otherwise conditioning) the grinding face of the grinding wheel during mirror finish grinding of the above materials. Other potential advantages of this invention will become apparent in the discussion and examples that follow.

One aspect of the present invention was the realization, contrary to conventional wisdom (see for example Japan Patent 60-118,469 to Ishihara), that abrasive articles including greater than 50 volume percent interconnected porosity, and in particular including from about 50 to about 80 volume percent interconnected porosity, may provide superior grinding performance when grinding hard and/or brittle materials, without substantially sacrificing the mechanical integrity of the abrasive article. Embodiments of the abrasive articles of this invention, therefore, include at least 50 volume percent interconnected porosity and effective amounts of at least one abrasive grain and bond material. The abrasive articles may further optionally include fillers, lubricants and other components known to those skilled in the art. These abrasive articles preferably include from about 50 to about 80 volume percent interconnected porosity, and most preferably from about 50 to about 70 volume percent interconnected porosity.

Substantially any abrasive grain may be used in the abrasive articles of this invention. Conventional abrasives may include, but are not limited to, alumina, silica, silicon carbide, zirconia-alumina, garnet, and emery in grit sizes ranging from about 0.5 to about 5000 microns, preferably from about 2 to about 300 microns. Superabrasive grains, including but not limited to diamond and cubic boron nitride (CBN), with or without a metal coating, having substantially similar grit sizes as the conventional grains, may also be used. Abrasive grain size and type selection typically vary depending on the nature of the workpiece and the type of grinding process. For fine finish (i.e., 'mirror finish') grinding, superabrasive grains having a smaller particle size, such as ranging from about 0.5 to about 120 microns or even from about 0.5 to about 75 microns may be desirable. In general, smaller (i.e., finer) grain sizes are preferred for fine grinding and surface finishing/polishing operations, while larger (i.e., coarser) grain sizes are preferred for shaping, thinning, and other operations in which a relatively large amount of material removal is required.

Substantially any type of bond material commonly used in the fabrication of bonded abrasive articles may be used as a matrix material in the abrasive article of this invention. For example, metallic, organic, resinous, or vitrified bond (together with appropriate curing agents if necessary) may be used, with metallic bond being generally desirable. A metal bond having a fracture toughness ranging from about 1.0 to about 6.0 MPa·m$^{1/2}$ is generally desirable, with a fracture toughness ranging from about 1.0 to about 3.0 MPa·m$^{1/2}$ being preferable. Further detail regarding fracture toughness is provided in U.S. Pat. No. 6,093,092 and 6,102,789 to Ramanath et al., which are fully incorporated herein by reference, and are hereinafter referred to as the Ramanath patents.

Materials useful in a metal bond matrix include, but are not limited to, bronze, copper, and zinc alloys (e.g., brass), cobalt, iron, nickel, silver, aluminum, indium, antimony, titanium, zirconium, and their alloys, and mixtures thereof. A mixture of copper and tin has been found to be a generally desirable metal bond matrix composition. Compositions including from about 35 to about 85 weight percent copper and from about 15 to about 65 weight percent tin may be suitable for the abrasive articles of this invention. Compositions including from about 35 to about 70 weight percent copper, from about 30 to about 65 weight percent tin, and optionally from about 0.2 to about 1.0 weight percent phosphorous (such as in a copper phosphorous alloy) are preferable. These bond materials may optionally be used with titanium or titanium hydride, chromium, or other known superabrasive reactive material capable of forming a carbide or nitride chemical linkage between the grain and the bond at the surface of the superabrasive grain under the selected sintering conditions to strengthen the grain/bond posts. Stronger grain/bond interactions generally reduce grain 'pullout' which tends to damage the workpiece and shorten tool life.

An example of a suitable organic bond is a thermosetting resin, but other types of resins may be used. Preferably, the resin is either an epoxy resin or a phenolic resin, and it may be used in liquid or powder form. Specific examples of suitable thermosetting resins include phenolic resins (e.g., novolak and resole), epoxy, unsaturated polyester, bismaleimide, polyimide, cyanate ester, melamines, and the like.

Embodiments of the abrasive article of this invention include from about 50 to about 80 volume percent interconnected porosity in which the average pore size ranges from about 25 to about 500 microns. The interconnected porosity is formed during fabrication by adding a sufficient quantity of dispersoid particles to the abrasive grain and bond mixture to insure that a relatively high percentage of dispersoid particles are in contact with other dispersoid particles in the molded abrasive article (before and after sintering).

One desirable porous embodiment includes from about 0.5 to about 25 volume percent superabrasive and from about 30.5 to about 49.5 volume percent metal bond matrix sintered together at a temperature ranging from about 370 to about 795° C. at a pressure ranging from about 20 to about 33 MPa. The metal bond matrix includes from about 35 to about 70 weight percent copper, from about from about 30 to about 65 weight percent tin, and from about 0.2 to about 1.0 weight percent phosphorous. The superabrasive includes diamond having a particle size ranging from about 0.5 to about 300 microns (and in particular embodiments, from about 0.5 to about 75 microns).

Other desirable porous embodiments include from about 40 to about 80 volume percent interconnected porosity in which the average pore size ranges from about 150 to about 500 microns. These embodiments further include from about 0.5 to about 25 volume percent superabrasive and from about 19.5 to about 65 volume percent organic bond cured together at temperatures ranging from about 100 to about 200° C. (or 400 to about 450° C. for polyimide resins) at pressures ranging from about 20 to about 33 MPa. (Dispersoids having an acicular shape, e.g., having an aspect ratio of >or =2:1, may be desirably used to achieve about 40 to 50 volume percent interconnected porosity.) The abrasive articles of this invention may be fabricated using conventional powder metallurgy/polymer fabrication processes, Abrasive, bond, and dispersoid powders of suitable size and composition are well mixed, molded into a suitable shape, and sintered/cured at a relatively high temperature and pressure to yield a relatively dense composite, preferably having a density of at least 95% of the theoretical density (and typically from about 98 to 99% of the theoretical density). For abrasive articles including a metal bond matrix, the powders are typically sintered in the range of from about 370 to about 795° C. at pressures in the range from about 20 to about 33 MPa. For example, in one embodiment the powder mixture is first heated to 401° C. for 20 minutes. The powders are then sintered at a temperature of 401° C. and a pressure of 22.1 MPa for 10 minutes. After cooling, the abrasive laden composites, including dispersoids that are substantially in contact with one another, are immersed in a solvent in order to selectively remove (i.e., dissolve) the dispersoids. The resultant abrasive article has a foam-like structure including a mixture of abrasive and bond matrix, and having a network of effectively randomly distributed interconnected pores (i.e., voids from which the dispersoid was dissolved).

Substantially any dispersoid that may be readily dissolved in a solvent such as water, alcohol, acetone, and the like, may be used. In general, dispersoids that are soluble in water, such as sodium chloride, potassium chloride, magnesium chloride, calcium chloride, sodium silicate, sodium carbonate, sodium sulfate, potassium sulfate, magnesium sulfate, and the like, and mixtures thereof are preferred. For use in some grinding applications (such as silicon wafers and other electronics components), the use of a non-ionic (i.e., non-salt) dispersoid, such as sugar, dextrin, polysaccharide oligomers, may be desirable. Most preferred are dispersoids having a relatively high solubility in water and relatively rapid dissolution kinetics, such as sodium chloride or sugar. Preferable dispersoids may also exhibit a relatively high melting point (mp) to withstand the sintering process. For example sodium chloride has a melting point of about 800° C. For abrasive articles requiring very high sintering temperatures, dispersoids such as sodium aluminum silicate (mp 1650° C.), magnesium sulfate (mp 1124° C.), potassium phosphate (mp 1340° C.), potassium silicate (mp 976° C.), sodium metasilicate (mp 1088° C.), and mixtures thereof may be used.

The particle size of the dispersoids is typically in the range from about 25 to about 500 microns. In one desirable embodiment the dispersoids include a particle size distribution from about 74 to about 210 microns (i.e., including dispersoid particles finer than U.S. Mesh (Standard Sieve) 70 and coarser than U.S. Mesh 200). In another desirable embodiment, the dispersoids include a particle size distribution from about 210 to about 300 microns (i.e., including dispersoid particles finer than U.S. Mesh 50 and coarser than U.S. Mesh 70). In yet another desirable embodiment, in which sugar is used as a dispersoid, particle size distributions ranging from about 150 to about 500 microns may be used (i.e. including dispersoid particles finer than U.S. Mesh 35 and coarser than U.S. Mesh 100).

The abrasive articles described hereinabove may be used to fabricate substantially any type of grinding tool. Generally desirable tools include surface grinding wheels (e.g., ANSI Type 2A2T or Type 2A2TS abrasive wheels and Type 1A and 1A1 abrasive wheels) as well as cup wheels (e.g., ANSI Type 2 or Type 6 wheels, or Type 119V bell-shaped cup wheels). The abrasive grinding wheels may include a core (e.g., core 20 of FIG. 2) having a central bore for mounting the wheel on a grinding machine, the core being designed to support a porous abrasive rim disposed along its periphery (see for example grinding wheel 100 in FIG. 2, which is discussed in more detail hereinbelow with respect to Example 1). These two portions of the wheel are typically held together with an adhesive bond that is thermally stable under grinding conditions, and the wheel and its components are designed to tolerate stresses generated at wheel peripheral speeds of up to at least 80m/sec, and desirably up to 160m/sec or more.

In one embodiment the core is substantially circular in shape. The core may comprise substantially any material having a minimum specific strength of 2.4 MPa-cm$^3$/g, and more desirably, in the range from about 40 to about 185 MPa-cm$^3$/g. The core material has a density of 0.5 to 8.0 g/cm$^3$, and preferably from about 2.0 to about 8.0 g/cm$^3$. Examples of suitable materials are steel, aluminum, titanium, bronze, their composites and alloys, and combinations thereof Reinforced plastics having the designated minimum specific strength may also be used to construct the core. Composites and reinforced core materials typically include a continuous phase of a metal or a plastic matrix, often initially provided in powder form, to which fibers or grains or particles of harder, more resilient, and/or less dense, material is added as a discontinuous phase. Examples of reinforcing materials suitable for use in the core of the tools of this invention are glass fiber, carbon fiber, aramid fiber, ceramic fiber, ceramic particles and grains, and hollow filler materials such as glass, mullite, alumina, and Z-Light spheres. Generally desirable metallic core materials include ANSI 4140 steel and aluminum alloys, 2024, 6065 and 7178. Further detail regarding suitable core materials, properties, and the like is provided in the Ramanath patents.

A grinding wheel (e.g., grinding wheel 100 shown in FIG. 2) may be fabricated by first forming individual segments of a preselected dimension, composition and porosity, as described hereinabove (see for example segment 10 shown in FIG. 1, which is discussed in more detail hereinbelow with respect to Example 1). Grinding wheels may be molded and sintered, fired, or cured by a variety of processes known in the art. Among these processes are hot pressing (at pressures of about 14–28 MPa), cold pressing (at pressures of about 400–500 MPa or more), and hot coining in a steel mold (at pressures of about 90–110 MPa). The skilled artisan will readily recognize that cold pressing (and to a lesser extent hot coining) are useful only for dispersoid particles having a high compressive strength (i.e., resistance to crushing). For metal bond abrasive articles, hot pressing (at about 350–500° C. and 22 MPa) is preferred. For organic bond abrasive articles in which a sugar containing dispersoid is used, cold or "warm" pressing (at temperatures less than about 160° C.) may be desirable. Additional details regarding pressing and thermal processing techniques are provided in U.S. Pat. No. 5,827,337, which is fully incorporated herein by reference.

Following pressing, thermal processing, and immersing into a solvent, the segments are typically finished by conventional techniques, such as by grinding or cutting using vitrified grinding wheels or carbide cutting wheels, to yield an abrasive rim segment having the desired dimensions and tolerances. The segments may then be attached to the periphery of the core with a suitable adhesive (see for example FIG. 2 which is also discussed hereinbelow). Desirable adhesives include 353-NDT epoxy resin (EPO-TEK, Billerica, Mass.) at a 10:1 weight ratio of resin to hardener, and Technodyne® HT-18 epoxy resin (obtained from Taoka Chemicals, Japan) and its modified amine hardener mixed in a ratio of about 100 parts by weight resin to about 19 parts by weight hardener. Further detail regarding adhesives, their properties, and the application thereof to metal bond grinding wheels is provided in the Ramanath patents.

An alternate grinding wheel fabrication method includes forming segment precursor units of a powder mixture of abrasive, bond, and dispersoid, molding the segment units around the circumference of the core, and applying heat and pressure to create and attach the segments in-situ (i.e., by co-sintering the core and the rim). After co-sintering, the grinding wheel is immersed in a selected solvent for dissolving the dispersoids from the rim, resulting in highly porous abrasive rim (as previously described). For this alternate process, it may be desirable to use dispersoids that do not contain chloride ions (e.g., sodium chloride), in the event the core material includes aluminum or an aluminum alloy (e.g., alloy 7075), since aluminum alloys may pit in the presence of chloride ions.

The abrasive articles and tools of this invention (e.g., grinding wheel 100 shown in FIG. 2 and discussed in more detail hereinbelow) are desirable for grinding ceramic materials including, various oxides, carbides, nitrides and, suicides such as silicon nitride, silicon dioxide, and silicon oxynitride, stabilized zirconia, aluminum oxide (e.g., sapphire), boron carbide, boron nitride, titanium diboride, and aluminum nitride, and composites of these ceramics, as well as certain metal matrix composites, such as cemented carbides, polycrystalline diamond and polycrystalline cubic boron nitride. Either single crystal or polycrystalline ceramics may be ground with these abrasive tools. Further, the abrasive articles and tools of this invention are particularly well suited for grinding materials used in electronics applications, such as silicon wafers (used in semiconductor manufacturing), alumina titanium carbide (used in magnetic head manufacturing), and other substrate materials.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

The following examples merely illustrate various embodiments of the articles and methods of this invention. The scope of this invention is not to be considered as limited by the specific embodiments described therein, but rather as defined by the claims that follow. Unless otherwise indicated, all parts and percentages in the examples are by weight.

EXAMPLE 1

Abrasive wheels 100 according to the principles of this invention were prepared in the form of Type 2A2TS metal bonded diamond wheels utilizing the materials and processes described below.

Powder metal alloy (defined hereinbelow) was mixed with non-iodized table salt (obtained from Shaw's, Inc., Worcester, Mass.) at a weight ratio of 65:35 metal alloy:table salt, which corresponds to a volume ratio of 31.56:68.44 metal alloy:table salt. The table salt (predominately sodium chloride) was milled in a Spex™ Mill (manufactured by SPEX Company, Metuchen, N.J.) and screened to provide a particle size distribution ranging from about 74 to about 210 microns (i.e., coarser than 200 U.S. Mesh and finer than 70 U.S. Mesh).

The powder metal alloy included a blend of 43.74 weight percent copper powder (Dendritic FS grade, particle size −325 mesh, obtained from Sintertech International Marketing Corp., Ghent, N.Y.), 6.24 weight percent phosphorus/copper powder (grade 1501, particle size −325 mesh, obtained from New Jersey Zinc Company, Palmerton, Pa.), and 50.02 weight percent tin powder (grade MD115, particle size −100/+325 mesh, 0.5% maximum, obtained from Alcan Metal Powders, Inc., Elizabeth, N.J.).

Fine diamond abrasive powder, particle size distribution from about 3 to about 6 microns was added to the metal alloy/table salt blend (2.67 grams of diamond was added to 61.29 grams of metal alloy/table salt blend) and the combination was thoroughly mixed using a Turbulan mixer (manufactured by Glen Mills, Inc., Clifton N.J.) until it was uniformly blended. The resulting mixture included about 5 volume percent diamond, about 30 volume percent metal bond matrix and about 65 volume percent table salt. Three drops of mineral spirit DL 42™ (obtained from Worcester Chemical, Worcester, Mass.) were added to the blend prior to mixing to help prevent separation of the ingredients. The mixture was then separated into 16 equal portions (each corresponding to one of the 16 abrasive segments 10 used on the abrasive wheel 100). Each portion was placed in a graphite mold and hot pressed at 407° C. for 10 minutes at 22.1 MPa (3200 psi) until a matrix with a target density in excess of 95% of theoretical had been formed. After cooling, the segments 10 were immersed in a relatively large quantity (e.g., 0.5 liter) of boiling water for 45 minutes in order to remove the salt therefrom. The segments 10 were then thoroughly rinsed with deionized (DI) water. This process was repeated to ensure complete removal of the salt. Subsequent weight loss and energy dispersive x-ray (EDX) measurements confirmed that substantially all table salt had been removed from the segments.

Referring to FIG. 1, a schematic representation of one segment 10 is shown. Each of the segments 10 were ground to the required dimensions and tolerances to match the periphery of a machined aluminum core 20 (wheel Type 2A2TS shown in FIG. 2). Segments 10 have an arcuate profile having an outer radius of curvature 11 of 127 millimeters (5 inches) and an inner radius of curvature 12 of 124 millimeters (4.9 inches). When viewed from the front (or back) segments 10 have a length dimension 13 of 47 millimeters (1.8 inches) and a width dimension 14 of 6.3 millimeters (0.25 inches).

Figure 2A:
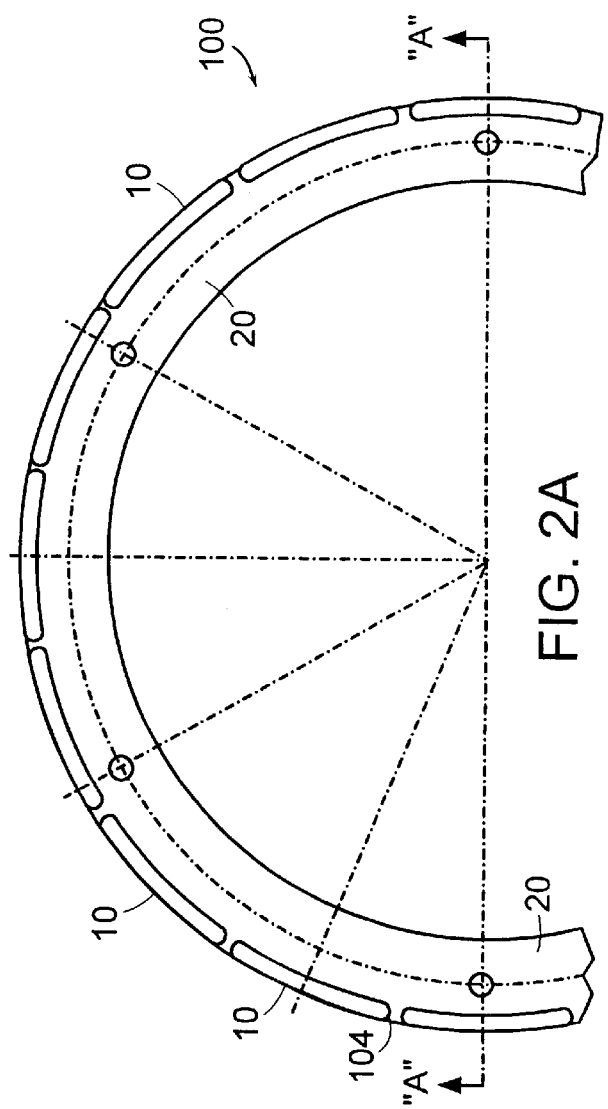
FIG. 2 is a schematic representation of one embodiment of a grinding wheel including sixteen of the abrasive segments of FIG. 1.
Figure 2B:
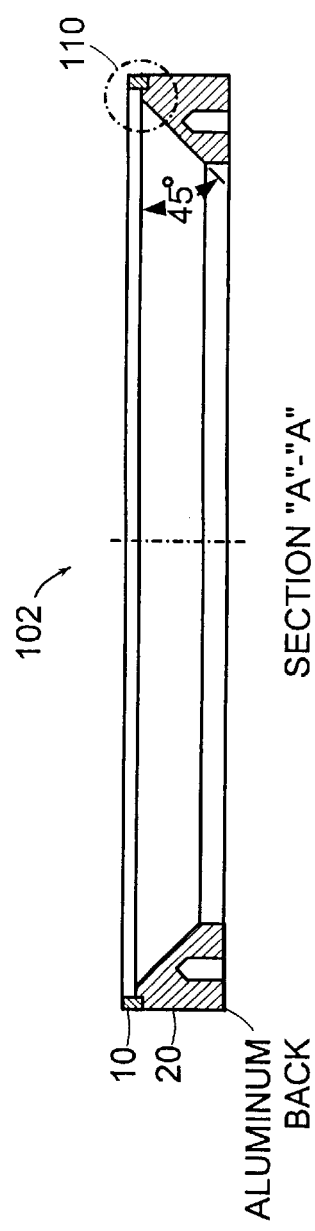
Figure 2C:
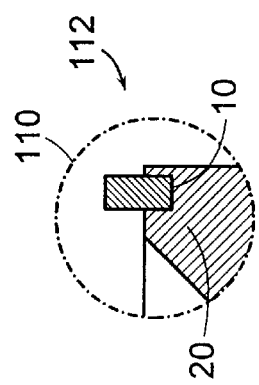

The segments 10 were used to construct a Type 2A2TS face-grinding type grinding wheel 100, as shown in FIG. 2. Grinding wheel 100 includes sixteen symmetrically spaced segments 10 bonded to an aluminum core 20, yielding a grinding wheel 100 having an outer diameter 102 of about 282 millimeters (11.1 inches) and a slotted rim 104. As shown at 110 the segmented rim protrudes a distance 112 from the face of aluminum core 20 of about 3.9 millimeters (0.16 inches). The abrasive segments 10 and the aluminum core 20 were assembled with an epoxy resin/amine hardener cement system (Technodyne HT-18 adhesive, obtained from Taoka Chemicals, Japan) to make grinding wheels having a slotted rim 104 consisting of sixteen abrasive segments 10. The contact surfaces of the core and the segments 10 were degreased and sandblasted to insure adequate adhesion.

EXAMPLE 2

Grinding Performance Evaluation

One metal bonded segmental wheel (wheel 2-A), fabricated according to the method of Example 1, above, was tested for finish backgrinding performance of silicon wafers. One commercially available grinding wheel of the same grit size and concentration in a resin bond (wheel specification D3/6MIC-IN.656-BX623, obtained from Saint Gobain Abrasives, Inc., Worcester, Mass.) recommended for finish backgrinding of a silicon wafer, served as a comparative wheel and was tested along with the wheel of this invention. This comparative wheel included about 5 volume percent diamond abrasive, about 62 volume percent hollow glass spheres, about 12 volume percent resin, and about 21 volume percent porosity. The glass spheres included about 15 volume percent glass shell. Therefore, the comparative wheel may be thought of as including about 9.3 volume percent glass shell and about 73.7 volume percent non-interconnected porosity (i.e., about 21% volume percent porosity plus about 52.7 volume percent hollow interior of the hollow glass spheres).

The grinding testing conditions were:

Grinding Test Conditions:

| Machine: | Strasbaugh 7AF Model | |
|---|---|---|
| Wheel Specifications: | Coarse spindle: | Norton #3-R1B69 |
| | Fine Spindle: | D3/6MIC-IN.656-BX623 |
| | | (comparative) |
| | | Wheel 2-A |
| Wheel Size: | Type 2A2TSSA: | 280 × 29 × 229 mm |
| | | (11 × 1 1/8 × 9 inch) |

-continued

| Grinding Mode: | Dual grind: | Coarse grind followed by fine grind |
|---|---|---|

Fine Grinding Process:

| Wheel Speed: | 4,350 rpm |
|---|---|
| Coolant: | Deionized water |
| Coolant Flow Rate: | 3 gal/min (11 liters/min) |
| Work Material: | Silicon wafers, N type 100 orientation, 150 mm diameter (6 inch), 0.66 mm (0.026 in.) starting thickness (obtained from Silicon Quest, CA) |
| Material Removed: | step 1: 10 μm, step 2: 5 μm, step 3: 5 μm, lift: 2 μm |
| Feed rate: | step 1: 1 μm/s, step 2: 0.7 μm/s, step 3: 0.5 μm/s, lift: 0.5 μm/s |
| Work Speed: | 699 rpm, constant |
| Dwell: | 100 rev |

Coarse Grinding Process:

| Wheel Speed: | 3,400 rpm |
|---|---|
| Coolant: | Deionized water |
| Coolant Flow Rate: | 3 gal/min (11 liters/min) |
| Work Material: | Silicon wafers, N type 100 orientation, 150 mm diameter (6 inch), 0.66 mm (0.026 in.) starting thickness (obtained from Silicon Quest, CA) |
| Material Removed: | step 1: 10 μm, step 2: 5 μm, step 3: 5 μm, lift: 10 μm |
| Feed rate: | step 1: 3 μm/s, step 2: 2 μm/s, step 3: 1 μm/s, lift: 5 μm/s |
| Work Speed: | 590 rpm, constant |
| Dwell: | 50 rev |

Where abrasive tools required truing and dressing, the conditions established for this test were as follows:

Truing and Dressing Operation:

| Coarse Wheel: | none |
|---|---|
| Fine Wheel: | using 150 mm (6 inch) diameter Strasbaugh coarse dressing pad |
| Wheel Speed: | 1200 rpm |
| Dwell: | 25 rev |
| Material removed: | step 1: 150 μm, step 2: 10 μm, lift: 20 μm |
| Feed rate: | step 1: 5 μm/s, step 2: 0.2 μm/s, lift: 2 μm/s |
| Work Speed: | 50 rpm, constant |

Results for the grinding test of Example 2 are shown below in Table 1. Fifty wafers were fine ground using the resin-bonded comparative wheel and the porous wheel of this invention (wheel 2-A). As shown in Table 1, both the control wheel and inventive wheel exhibited relatively stable peak normal force for at least fifty wafers. Each wheel also required approximately the same peak normal force. This type of grinding performance is highly desirable in backgrinding silicon wafers because these relatively low force, steady state conditions minimize thermal and mechanical damage to the workpiece.

Further, the porous wheel of this invention provided for the highly desirable grinding performance described above for at least fifty wafers without the need for dressing of the wheel.

In summary, Example 2 shows that the inventive wheel provides for highly desirable backgrinding performance on silicon wafers, while unexpectedly (for a metal bonded wheel) using less power than a comparable resin bonded wheel.

TABLE 1

| Wafer Number | Comparative Wheel | | Test Wheel | |
|---|---|---|---|---|
| | Peak Current, Amps | Peak Normal Force, N | Peak Current, Amps | Peak Normal Force, N |
| 5 | 10.7 | 66.9 | 8.0 | 62.4 |
| 10 | 10.5 | 66.9 | 8.3 | 66.9 |
| 15 | 10.6 | 66.9 | 8.4 | 62.4 |
| 20 | 10.9 | 66.9 | 9.0 | 66.9 |
| 25 | 11.3 | 66.9 | 8.1 | 62.4 |
| 30 | 10.7 | 66.9 | 8.4 | 60.0 |
| 35 | 10.8 | 66.9 | 8.3 | 62.4 |
| 40 | 10.5 | 62.4 | 8.4 | 60.0 |
| 45 | 10.5 | 62.4 | 8.4 | 66.9 |
| 50 | 10.1 | 66.9 | 8.8 | 60.0 |

EXAMPLE 3

Grinding Performance Evaluation

One metal bonded segmental wheel (wheel 3-A), fabricated according to the method of Example 1, above, was tested for fine finish backgrinding performance on etched silicon wafers. One commercially available grinding wheel, which is described in more detail in Example 2 hereinabove, recommended for finish backgrinding of a silicon wafer, served as a comparative wheel and was tested along with the wheel of this invention.

The grinding testing conditions were:

Grinding Test Conditions:

| | | |
|---|---|---|
| Machine: | Strasbaugh 7AF Model | |
| Wheel Specifications: | Coarse spindle: | none |
| | Fine Spindle: | D3/6mic-20BX623C (comparative) Wheel 3-A |
| Wheel Size: | Type 2A2TSSA: | 280 × 29 × 229 mm (11 × 1 1/8 × 9 inch) |
| Grinding Mode: | Single grind: | Using only Fine Spindle |

Fine Grinding Process:

| | |
|---|---|
| Wheel Speed: | 4,350 rpm |
| Coolant: | Deionized water |
| Coolant Flow Rate: | 3 gal/min (11 liters/min) |
| Work Material: | Silicon wafers, N type 100 orientation, 150 mm diameter (6 inch), 0.66 mm (0.026 in.) starting thickness (obtained from Silicon Quest, CA) |
| Material Removed: | step 1: 10 $\mu$m, step 2: 5 $\mu$m, step 3: 5 $\mu$m, lift: 2 $\mu$m |
| Feed rate: | step 1: 1 $\mu$m/s, step 2: 0.7 $\mu$m/s, step 3: 0.5 $\mu$m/s, lift: 0.5 $\mu$m/s |
| Work Speed: | 699 rpm, constant |
| Dwell: | 100 rev |

Where abrasive tools required truing and dressing, the conditions established for this test were as follows:

Truing and Dressing Operation:

| | |
|---|---|
| Fine Wheel: | using 150 mm (6 inch) diameter Strasbaugh coarse dressing pad |
| Wheel Speed: | 1200 rpm |
| Dwell: | 25 rev |
| Material removed: | step 1: 150 $\mu$m, step 2: 10 $\mu$m, lift: 20 $\mu$m |
| Feed rate: | step 1: 5 $\mu$m/s, step 2: 0.2 $\mu$m/s, lift: 2 $\mu$m/s |
| Work Speed: | 50 rpm, constant |

Results for the grinding test of Example 3 are shown below in Table 2. Fifty-five etched silicon wafers were fine finish background using the resin-bonded comparative wheel. In backgrinding etched silicon wafers, a coarse grind step is not used, since the surface of the etched silicon is relatively smooth. As shown in Table 2, the peak normal force increases relatively continuously as more parts are ground, eventually increasing to a value at which the grinding machine shuts down. Seventy-five etched silicon wafers were ground using the porous wheel of this invention. As also shown in Table 2, the peak normal forces remain low and stable over the course of the entire experiment. These results clearly demonstrate the self-dressing nature of the inventive wheel.

This type of grinding performance is highly desirable in backgrinding silicon wafers because these relatively low force, steady state conditions minimize thermal and mechanical damage to the workpiece. Further, the self-dressing nature of the wheel may provide for a backgrinding operation in which it is not necessary to dress (or otherwise condition) the grinding wheel. As a result, the wheels of this invention may provide for increased throughput, reduced costs, and more consistent grinding results than those achieved using conventional grinding wheels.

In summary, Example 3 shows that the inventive wheel provides for highly desirable backgrinding performance on etched silicon wafers, while substantially eliminating the need for dressing of the wheel. The performance of the inventive wheel is substantially superior to that of the conventional resin-bonded wheels in this application.

TABLE 2

| Wafer Number | Comparative Wheel | | Test Wheel | |
|---|---|---|---|---|
| | Peak Current, Amps | Peak Normal Force, N | Peak Current, Amps | Peak Normal Force, N |
| 5 | 8.9 | 75.8 | 8.2 | 62.4 |
| 10 | 9.0 | 84.7 | 8.1 | 62.4 |
| 15 | 9.0 | 98.1 | 8.0 | 62.4 |
| 20 | 9.2 | 107.0 | 8.3 | 66.9 |
| 25 | 9.4 | 115.9 | 8.1 | 62.4 |
| 30 | 9.6 | 124.9 | 8.5 | 62.4 |
| 35 | 9.9 | 156.1 | 8.3 | 66.9 |
| 40 | 10.3 | 182.8 | 8.1 | 66.9 |
| 45 | 10.8 | 214.0 | 8.1 | 66.9 |
| 50 | 11.5 | 231.9 | 7.9 | 66.24 |
| 55 | 11.5 | 245.3 | 8.1 | 66.9 |
| 60 | * | * | 7.8 | 62.4 |
| 65 | * | * | 8.0 | 66.9 |
| 70 | * | * | 8.0 | 62.4 |
| 75 | * | * | 8.1 | 66.9 |

*grinding machine shut down as normal force exceeded machine limits.

EXAMPLE 4

Grinding Performance Evaluation

Two metal bonded segmented wheels, made in a manner similar to the method of Example 1, above, were tested for grinding performance. Both wheels included about 14 volume percent diamond abrasive having a particle size distribution from about 63 to about 74 micron (i.e., particles finer than U.S. Mesh 200 and coarser than U.S. Mesh 230). The wheels further included about 21 volume percent metal bond (having the composition described in Example 1) and about 65 volume percent interconnected porosity. The first wheel (wheel 4-A) was fabricated using −70/+200 U.S. Mesh table salt dispersoid, as described in Example 1, likely resulting in a pore size ranging from about 74 to about 210 microns (the pore size is assumed to be approximately the same size as that of the removed salt dispersoid). The second wheel (wheel 4-B) was fabricated using −50/+70 U.S. Mesh table salt,. likely resulting in a pore size ranging from about 210 to about 300 microns. While not measured, it is expected that the wheel having a larger pore size also included a larger metal bond filament size. The term 'filament' is used consistently with normal usage familiar to the skilled artisan, to refer to the connecting matrix material (i.e., the framework of the porous structure) disposed between the interconnected pores.

The two grinding wheels descried above were used to coarse grind 4.5 inch square AlTiC wafers. The grinding test conditions were:

Grinding Test Conditions:

| Machine: | Strasbaugh 7AF Model | |
|---|---|---|
| Wheel Specifications: | Coarse spindle: | Wheel 4-A Wheel 4-B |
| | Fine Spindle: | none |
| Wheel Size: | Type 2A2TSSA: | 280.16 × 28.90 × 228.65 mm (11 × 1 1/8 × 9 inch) |
| Grinding Mode: | Single grind: | Coarse grind only |

Coarse Grinding Process:

| Wheel Speed: | 2,506 rpm |
|---|---|
| Coolant: | Deionized water |
| Coolant Flow Rate: | 3 gal/min (11 liters/min) |
| Work Material: | Alumina-titanium carbide 3M-310 wafers, 114.3 mm square (4.5 inch), 2.0 mm (0.8 in.) starting thickness (obtained from Minnesota Mining and Manufacturing Corporation, Minneapolis, MN) |
| Material Removed: | step 1: 100 $\mu$m, step 2: 100 $\mu$m, step 3: 100 $\mu$m, lift: 20 $\mu$m |
| Feed rate: | step 1: 0.7 $\mu$m/s, step 2: 0.7 $\mu$m/s, step 3: 0.7 $\mu$m/s, lift: 0.5 $\mu$m/s |
| Work Speed: | 350 rpm, constant |
| Dwell: | 0 rev |

Where abrasive tools required truing and dressing, the conditions established for this test were as follows:

Truing and Dressing Operation:

| Coarse Wheel: | using 150 mm (6 inch) diameter Strasbaugh coarse dressing pad |
|---|---|
| Wheel Speed: | 1200 rpm |
| Dwell: | 25 rev |
| Material removed: | step 1: 150 $\mu$m, step 2: 10 $\mu$m, lift: 20 $\mu$m |
| Feed rate: | step 1: 5 $\mu$m/s, step 2: 0.2 $\mu$m/s, lift: 2 $\mu$m/s |
| Work Speed: | 50 rpm, constant |

Results for the grinding test of Example 4 are shown below in Table 3. Both wheels were observed to successfully grind the AlTiC wafer, exhibiting relatively stable peak normal forces with time and sufficient stock removal. The first wheel, having a relatively fine pore size (and likely a relatively fine metal bond filament size) was used to grind the AlTiC wafer for about 25 minutes (1500 seconds). A relatively stable peak normal force of about 35 N was observed and about 1150 microns of AlTiC was removed from the wafer (a stock removal rate of about 46 microns/min). The wheel was observed to wear about 488 microns (a material removal/wheel wear ratio of about 2.4). The second wheel, having a relatively coarse pore size (and likely a relatively coarse metal bond filament size) was used to grind the AlTiC wafer for about seven minutes (420 seconds). A relatively stable peak normal force of about 94 N was observed and about 2900 microns of AlTiC was removed from the wafer (a stock removal rate of about 414 microns/min). The wheel was observed to wear about 18 microns (a material removal/wheel wear ratio of about 160).

In summary, Example 4 shows that the highly porous wheels of this invention are well suited for grinding AlTiC wafers. Further, this example shows that the wear resistance and self-dressing properties of the wheels of this invention may be tailored by adjusting the relative pore size of the abrasive articles. While not wishing to be bound by a particular theory, it is believed that the increased wheel wear of the wheel including the relatively fine pores is related to a weakening of the metal bond as the metal bond filament size is reduced. Nevertheless, this Example indicates that the properties of the wheel may be engineered for specific applications by adjusting the relative pore size therein.

TABLE 3

| Wheel Specification (Salt Size) | Peak Normal Force, N | Wheel Wear, microns |
|---|---|---|
| Wheel 4-B (−50/+70) | 93.6 | 17.8 |
| Wheel 4-A (−70/+200) | 35.7 | 487.6 |

EXAMPLE 5

Grinding Performance Evaluation

One metal bonded segmental wheel (wheel 5-A), made according to the method of Example 1, above, was tested for finish backgrinding performance on a 50 mm (2 inch) single crystal silicon carbide wafers. One commercially available grinding wheel, which is described in more detail in Example 2 hereinabove, recommended for finish backgrinding of a silicon wafer, served as a comparative wheel and was tested along with the wheel of this invention.

The grinding testing conditions were:

Grinding Test Conditions:

| Machine: | Strasbaugh 7AF Model | |
|---|---|---|
| Wheel Specifications: | Coarse spindle: | ASDC320-7.5MXL2040(S.P.) |
| | Fine Spindle: | D3/6MIC-20BX623C (comparative) Wheel 5-A |
| Wheel Size: | Type 2A2TSSA: | 280.16 × 28.90 × 228.65 mm (11 × 1 1/8 × 9 inch) |
| Grinding Mode: | Dual grind: | Coarse grind followed by fine grind |

Fine Grinding Process:

| | |
|---|---|
| Wheel Speed: | 4,350 rpm |
| Coolant: | Deionized water |
| Coolant Flow Rate: | 3 gal/min (11 liters/min) |
| Work Material: | Silicon carbide wafers, single crystal, 50 mm diameter (2 inch), 300 micron (0.0075 in.) starting thickness (obtained from CREE Research, Inc.) |
| Material Removed: | step 1: 15 µm, step 2: 15 µm, lift: 5 µm |
| Feed rate: | step 1: 0.5 µm/s, step 2: 0.2 µm/s, lift: 1.0 µm/s |
| Work Speed: | 350 rpm, constant |
| Dwell: | 150 rev |

Coarse Grinding Process:

| | |
|---|---|
| Wheel Speed: | 3,400 rpm |
| Coolant: | Deionized water |
| Coolant Flow Rate: | 3 gal/min (11 liters/min) |
| Work Material: | Silicon carbide wafers, single crystal, 50 mm diameter (2 inch), 300 micron (0.0075 in.) starting thickness (obtained from CREE Research, Inc.) |
| Material Removed: | step 1: 10 µm, step 2: 10 µm, lift: 5 µm |
| Feed rate: | step 1: 0.7 µm/s, step 2: 0.3 µm/s, lift: 1.0 µm/s |
| Work Speed: | 350 rpm, constant |
| Dwell: | 0 rev |

Truing Operation:

| | |
|---|---|
| Coarse Wheel: | none |
| Fine Wheel: | using 150 mm (6 inch) diameter Strasbaugh coarse dressing pad |
| Wheel Speed: | 1200 rpm |
| Dwell: | 25 rev |
| Material removed: | step 1: 150 µm, step 2: 10 µm, lift: 20 µm |
| Feed rate: | step 1: 5 µm/s, step 2: 0.2 µm/s, lift: 2 µm/s |
| Work Speed: | 50 rpm, constant |

Results for the grinding test of Example 5 are shown below in Table 4. The commercial resin-bonded abrasive wheel was virtually incapable of grinding the silicon carbide wafer, as indicated by the extremely low removal rates. On the other hand, the highly porous wheel of this invention successfully ground the extremely hard and brittle silicon carbide wafer. During each 48 minute run, approximately 15 microns was removed for an average removal rate of 0.31 microns/min. Furthermore, the porous wheel of this invention was found to significantly reduce the surface roughness (as measured by a Zygo® white light interferometer, Zygo Corporation, Middlefield, Conn.). As shown in Table 4, grinding with the inventive wheel consistently reduced the average surface roughness (Ra) from a starting value of greater than 100 angstroms to less than about 40 angstroms (with one exception).

In summary, Example 5 shows that the inventive wheel provides for desirable grinding performance on hard, brittle silicon carbide wafers. The performance of the inventive wheel is substantially superior to that of a conventional resin-bonded wheel in this application.

TABLE 4

| Run # Test 8.299 | Wheel Specification | Stock Removal, microns | Surface Roughness, Angstroms |
|---|---|---|---|
| 6 | Comparative wheel | 3 | |
| 7 | " | 0 | 98 |
| 19 | Wheel 5-A | 17 | 34 |
| 20 | Wheel 5-A | 13 | 32 |
| 21 | Wheel 5-A | 15 | 54.5 |
| 22 | Wheel 5-A | 15 | 37.5 |

EXAMPLE 6

A quantitative measurement of the openness of porous media by permeability testing, based on D'Arcy's Law governing the relationship between the flow rate and pressure on porous media, was used to evaluate wheels of this invention. The permeability measurement apparatus and method used is substantially identical to that described by Wu et al., in U.S. Pat. No. 5,738,697, Example 6, namely by applying pressurized air at a flat surface of porous test samples.

Porous samples were made in a manner substantially similar to the method of Example 1, including 5 volume percent of 3/6 micron diamond abrasive. The relative amounts of table salt and metal bond were varied, resulting in samples including from about 0 to about 80 volume percent interconnected porosity. Samples measuring 1.5 inch in diameter and 0.5 inch in thickness were hot pressed at 405 degrees C. at a pressure of 3200 psi. Upon cooling the samples were lapped by hand using a silicon carbide abrasive slurry (180 grit size) in order to open the pores on the surfaces thereof The samples were then immersed in boiling water as described in Example 1. Four samples were prepared for each porosity value. Average permeability results are shown below in Table 5.

Permeability values are reported in units of volume of air per unit time (Q, in cc/second) per unit pressure (P, inches of water) and were measured through the thickness of samples having a diameter of 1.5 inches (37.5mm) and a thickness of 0.5 inch (12.7mm). As expected, permeability values were low for the samples having effectively no interconnected porosity. Permeability was observed to increase significantly with increasing porosity. In particular, samples having greater than about 50% interconnected porosity where characterized as having permeability values of greater than about 0.2 cubic centimeter per second per inch of water as the porosity increased above about 50 volume percent.

TABLE 5

| Metal Bond, weight percent | Table Salt, weight percent | Theoretical Porosity, volume percent | Permeability, Q/P (cc/sec/inch $H_2O$/0.5 inch) |
|---|---|---|---|
| 100 | 0 | 0 | 0.030 |
| 91.85 | 8.15 | 25 | 0.034 |
| 84.7 | 15.3 | 40 | 0.085 |
| 74.55 | 25.45 | 55 | 0.287 |
| 65.0 | 35.0 | 65 | 0.338 |
| 58.99 | 41.01 | 70 | 0.562 |
| 43.02 | 56.98 | 80 | n/a |

EXAMPLE 7

Segmented grinding wheels, each including sixteen segments, were assembled in a manner substantially similar to that described in Example 1 (hereinabove). The segments, however, included an organic bond (as opposed to the metal bond described in Example 1) and were fabricated as described below:

Granular sugar (obtained from Shaw's, Inc., Worcester, Mass.) was shaken in a 1-gallon paint can for approximately 2 hours using a paint shaker (made by Red Devil®, Inc., Union, N.J.), in order to break off the sharp corners and edges, thereby effectively "rounding" the sugar granules. The granular sugar was then screened to obtain a particle size distribution from about 250 to about 500 microns (i.e., −35/+60 U.S. Mesh).

Powdered resin bond was pre-screened through a U.S. Mesh 200 screen in order to remove agglomerates. Fine diamond abrasive powder, particle size distribution from about 3 to about 6 microns obtained from Amplex® Corporation (Olyphant, Pa.) as RB3/6 was added to the powdered resin and mixed until substantially homogeneous. The mixture, including approximately 80 volume percent resin and about 20 volume percent abrasive, was screened three times through a U.S. Mesh 165 screen and was then added to granular sugar (prepared as described above). The resin/abrasive/sugar mixture was then mixed until substantially homogeneous and screened twice through a U.S. Mesh 24 screen.

Three composite mixtures were fabricated. The first mixture (used in the fabrication of wheel 7-A) included about 4 volume percent diamond abrasive, about 20 volume percent 33–344 resin bond (a bis phenol-A modified phenolic resole resin obtained from Durez® Corporation of Dallas, Tex.), and about 76 volume percent granular sugar, The second mixture (used in the fabrication of wheel 7-B) included about 6 volume percent diamond abrasive, about 30 volume percent 29–346 resin bond (a long flow phenolic novolac resin obtained from Durez® Corporation of Dallas, Tex.), and about 64 volume percent granular sugar. The third mixture (used in the fabrication of wheel 7-C) included about 6 volume percent diamond abrasive, about 30 volume percent 29–108 resin bond (a very long flow biphenol-A modified resole obtained from Durez® (Corporation of Dallas, Tex.), and about 64 volume percent granular sugar.

The resin/abrasive/sugar mixtures were paired into disk shaped steel molds, leveled, and pressed at a temperature of about 135° C. at a pressure of about 4100 psi (28 MPa) for about 30 minutes until a matrix with approximately 99% theoretical density is achieved. After cooling the disks were lightly sanded with 180 grit sandpaper to remove the mold skin and the sugar dispersoid removed by immersing in boiling water for approximately 2 hours. After sugar removal the disks were dried and baked to complete the curing of the resin. The drying and baking cycle was as follows. The disks were first ramped to 60° C. with a ramp time of about 5 minutes and held thereat for about 25 minutes. The disks were then ramped to 90° C. with a ramp time of about 30 minutes and held thereat for 5 hours. Finally, the disks were ramped to 160° C. with a ramp time of about 4 hours and held thereat for about 5 hours. After baking the disks were cooled to room temperature and milled into segments for use in assembling grinding wheels.

Three organic bonded segmented wheels were tested for fine backgrinding performance on silicon wafers. The grinding testing conditions were:

Grinding Test Conditions:

| Machine: | Strasbaugh 7AF Model | |
|---|---|---|
| Wheel Specifications: | Coarse spindle: | Norton #3-R7B69 |
| | Fine Spindle: | Wheel 7-A |
| | | Wheel 7-B |
| | | Wheel 7-C |
| Wheel Size: | Type 2A2TSSA: | 280 × 29 × 229 mm (11 × 1 1/8 × 9 inch) |
| Grinding Mode: | Dual grind: | Coarse grind followed by fine grind |

Fine Grinding Process:

| Wheel Speed: | 4,350 rpm |
|---|---|
| Coolant: | Deionized water |
| Coolant Flow Rate: | 3 gal/min (11 liters/min) |
| Work Material: | Silicon wafers, N type 100 orientation, 150 mm diameter (6 inch), 0.66 mm (0.026 in.) starting thickness (obtained from Silicon Quest, CA) |
| Material Removed: | step 1: 10 $\mu$m, step 2: 5 $\mu$m, step 3: 5 $\mu$m, lift: 2 $\mu$m |
| Feed rate: | step 1: 1 $\mu$m/s, step 2: 0.7 $\mu$m/s, step 3: 0.5 $\mu$m/s, lift: 0.5 $\mu$m/s |
| Work Speed: | 590 rpm, constant |
| Dwell: | 100 rev |

Coarse Grinding Process:

| Wheel Speed: | 3,400 rpm |
|---|---|
| Coolant: | Deionized water |
| Coolant Flow Rate: | 3 gal/min (11 liters/min) |
| Work Material: | Silicon wafers, N type 100 orientation, 150 mm diameter (6 inch), 0.66 mm (0.026 in.) starting thickness (obtained from Silicon Quest, CA) |
| Material Removed: | step 1: 10 $\mu$m, step 2: 5 $\mu$m, step 3: 5 $\mu$m, lift: 10 $\mu$m |
| Feed rate: | step 1: 3 $\mu$m/s, step 2: 2 $\mu$m/s, step 3: 1 $\mu$m/s, lift: 5 $\mu$m/s |
| Work Speed: | 590 rpm, constant |
| Dwell: | 50 rev |

Where abrasive tools required truing and dressing, the conditions established for this test were as follows:

Truing and Dressing Operation:

| Coarse Wheel: | using 150 mm (6 inch) diameter Stradbaugh coarse dressing pad |
|---|---|
| Wheel Speed: | 1200 rpm |
| Dwell: | 25 rev |
| Material removed: | step 1: 190 $\mu$m, step 2: 10 $\mu$m, lift: 20 $\mu$m |
| Feed rate: | step 1: 5 $\mu$m/s, step 2: 0.2 $\mu$m/s, lift: 2 $\mu$m/s |
| Work Speed: | 50 rpm, constant |
| Fine Wheel: | using 150 mm (6 inch) diameter Strasbaugh extra fine dressing pad |
| Wheel Speed: | 1200 rpm |
| Dwell: | 25 rev |
| Material removed: | step 1: 150 $\mu$m, step 2: 10 $\mu$m, lift: 20 $\mu$m |
| Feed rate: | step 1: 5 $\mu$m/s, step 2: 0.2 $\mu$m/s, lift: 2 $\mu$m/s |
| Work Speed: | 50 rpm, constant |

Results for the grinding test of Example 7 are shown below in Table 6. Two-hundred wafers were fine ground using the porous, resin-bonded wheels of this invention (wheels 7-A, 7-B, and 7-C). Each of the inventive wheels exhibited relatively stable peak normal force of about 90 N (i.e., about 20 lbs) for at least two-hundred wafers. This type of grinding performance is highly desirable in backgrinding silicon wafers because these relatively low force, steady state conditions minimize thermal and mechanical damage to the workpiece. Further, the porous wheel of this invention provided for the highly desirable grinding performance described above for at least two-hundred wafers without the need for dressing of the wheel.

Additionally, the resin-type was observed to effect the wear rate of the grinding wheel. Wheels 7-A and 7-C exhibited relatively high wear rates of 2.2 and 1.7 microns per wafer, respectively, while wheel 7-B (including the long flow phenolic novolac resin) exhibited a relatively low (and desirable) wear rate of 0.5 microns per wafer.

In summary, Example 7 shows that the inventive wheels including organic bond provide for highly desirable back-grinding performance on silicon wafers.

TABLE 6

| Wheel Specification | Peak Normal Force (N) | Wear Rate (micron/wafer) |
|---|---|---|
| Wheel 7-A (DZ 33-344) | 90 | 2.2 |
| Wheel 7-B (IZ 29-346) | 90 | 0.5 |
| Wheel 7-C (IZ 19-108) | 90 | 1.7 |

What is claimed is:

1. An abrasive segment for a segmented grinding wheel, said abrasive segment comprising:
   a composite including a plurality of superabrasive grains and a metal bond matrix sintered together, said composite having a plurality of interconnected pores disposed therein, said composite including from about 0.5 to about 25 volume percent abrasive grain, from about 19.5 to about 49.5 percent metal bond and from about 50 to about 80 volume percent interconnected porosity;
   said metal bond matrix including from about 35 to about 70 weight percent copper, from about 30 to about 65 weight percent tin, and from about 0.2 to about 1.0 weight percent phosphorus,
   wherein said plurality of superabrasive grains are selected from the group consisting of diamond and cubic boron nitride, said superabrasive grains having an average particle size of less than about 300 microns.

2. The abrasive segment of claim 1 wherein the composite is sinterable at a temperature ranging from about 370 to about 795° C.

3. The abrasive segment of claim 1 wherein said composite comprises:
   greater than or equal to about 50 volume percent interconnected porosity; and
   less than or equal to about 70 volume percent interconnected porosity.

4. The abrasive segment of claim 1 wherein said plurality of interconnected pores has an average pore size ranging from:
   greater than or equal to about 25 microns; and
   less than or equal to about 500 microns.

5. The abrasive segment of claim 1 wherein said plurality of interconnected pores has an average pore size distribution ranging from:
   greater than or equal to about 74 microns; and
   less than or equal to about 210 microns.

6. The abrasive segment of claim 1 wherein said plurality of interconnected pores has an average pore size distribution ranging from:
   greater than or equal to about 210 microns; and
   less than or equal to about 300 microns.

7. The abrasive segment of claim 1 wherein said plurality of superabrasive grains has an average particle size ranging from:
   greater than or equal to about 0.5 microns; and
   less than or equal to about 75 microns.

8. The abrasive segment of claim 1 wherein said interconnected porosity is formed by:
   a) adding a dispersoid to the grains and metal bond prior to sintering the composite; and
   b) immersing said sintered composite into a solvent and dissolving the dispersoid;
   said abrasive segment being substantially free of dispersoid particles.

9. The abrasive segment of claim 1 having a permeability of greater than or equal to about 0.2 cubic centimeter per second per inch of water.

10. A segmented grinding wheel comprising:
    a core;
    an abrasive rim including a plurality of the segments of claim 1; and
    a thermally stable bond between said core and each of said plurality of segments.

11. A segmented grinding wheel comprising:
    a core having a minimum specific strength of 2.4 MPa-cm$^3$/g, a core density of 0.5 to 8.0 g/cm$^3$, and a circular perimeter;
    an abrasive rim including a plurality of segments, each of said segments including a composite including a plurality of abrasive grains and a metal bond matrix sintered together, said composite having a plurality of interconnected pores disposed therein, said composite including from about 50 to about 80 volume percent interconnected porosity; and
    a thermally stable bond between said core and each of said plurality of segments.

12. The segmented grinding wheel of claim 11 wherein the composite is sinterable at a temperature ranging from about 370 to about 795° C.

13. The segmented grinding wheel of claim 11 wherein said metal bond comprises from about 35 to about 85 weight percent copper and from about 15 to about 65 weight percent tin.

14. The segmented grinding wheel of claim 11 wherein said metal bond further comprises from about 0.2 to about 1.0 weight percent phosphorus.

15. The segmented grinding wheel of claim 11 wherein said abrasive grains comprise superabrasive grains selected from the group consisting of diamond and cubic boron nitride.

16. The segmented grinding wheel of claim 11 wherein said abrasive grain comprises diamond.

17. The segmented grinding wheel of claim 11 wherein said abrasive grain has an average particle size ranging from:
    greater than or equal to about 0.5 microns; and
    less than or equal to about 300 microns.

18. The segmented grinding wheel of claim 11 wherein said plurality of interconnected pores have an average pore size ranging from:
    greater than or equal to about 25 microns; and
    less than or equal to about 500 microns.

19. The segmented grinding wheel of claim 11 wherein said plurality of interconnected pores have a pore size distribution ranging from:

greater than or equal to about 74 microns; and less than or equal to about 210 microns.

20. The segmented grinding wheel of claim 11 wherein said plurality of interconnected pores have a pore size distribution ranging from:

greater than or equal to about 210 microns; and less than or equal to about 300 microns.

21. The segmented grinding wheel of claim 11 wherein said interconnected porosity is formed by:

a) adding a dispersoid to the grains and metal bond of each of said plurality of segments prior to sintering; and b) immersing each of said plurality of segments into a solvent and dissolving the dispersoid;

wherein each of said plurality of segments is substantially free of dispersoid particles.

22. The segmented grinding wheel of claim 11 wherein each of said segments has a permeability of greater than or equal to about 0.2 cubic centimeter per second per inch of water.

23. The segmented grinding wheel of claim 11 wherein said thermally stable bond is selected from the group consisting of an epoxy adhesive bond, a metallurgical bond, a mechanical bond, a diffusion bond, and combinations thereof.

24. The segmented grinding wheel of claim 11 wherein said thermally stable bond is an epoxy adhesive bond.

25. The segmented grinding wheel of claim 11 wherein:

said metal bond comprises from about 35 to about 85 weight percent copper, from about 15 to about 65 weight percent tin, and from about 0.2 to about 1.0 weight percent phosphorus;

said abrasive grain comprises diamond having a particle size from about 0.5 to about 300 microns; and said plurality of interconnected pores have an average pore size ranging from about 25 to about 500 microns.

26. An abrasive segment for a segmented grinding wheel, said abrasive segment comprising:

a composite including a plurality of superabrasive grains and a non-metallic bond matrix cured together, said composite having a plurality of interconnected pores disposed therein, said composite including from about 0.5 to about 25 volume percent abrasive grain, from about 19.5 to about 65 percent non-metallic bond and from about 40 to about 80 volume percent interconnected porosity; and;

wherein said plurality of superabrasive grains are selected from the group consisting of diamond and cubic boron nitride, said superabrasive grains having an average particle size of less than about 300 microns.

27. The abrasive segment of claim 26 wherein the composite is curable at a temperature ranging from about 100 to about 200° C.

28. The abrasive segment of claim 26 wherein said plurality of superabrasive grains comprise diamond and have an average particle size ranging from:

greater than or equal to about 0.5 microns; and less than or equal to about 75 microns.

29. The abrasive segment of claim 26 wherein said interconnected porosity is formed by:

a) adding a dispersoid to the grains and non-metallic bond prior to curing the composite; and b) immersing said cured composite into a solvent and dissolving the dispersoid;

said abrasive segment being substantially free of dispersoid particles.

30. The abrasive segment of claim 29 wherein said dispersoid comprises sugar, said solvent comprises water, and said non-metallic bond comprises phenolic resin.

31. A segmented grinding wheel comprising:

a core having a minimum specific strength of 2.4 MPa-cm$^3$/g, a core density of 0.5 to 8.0 g/cm$^3$, and a circular perimeter;

an abrasive rim including a plurality of segments, each of said segments including a composite of abrasive grains and a non-metallic bond matrix cured together, said composite having a plurality of interconnected pores disposed therein, said composite including from about 40 to about 80 volume percent interconnected porosity; and a thermally stable adhesive bond between said core and each of said plurality of segments.

32. The segmented grinding wheel of claim 31 wherein the composite is curable at a temperature ranging from about 100 to about 200° C.

33. The segmented grinding wheel of claim 31 wherein the non-metallic bond matrix comprises an organic bond matrix.

34. The segmented grinding wheel of claim 33 wherein said organic bond matrix comprises a phenolic resin matrix.

35. The segmented grinding wheel of claim 33 wherein said interconnected porosity is formed by:

a) adding a dispersoid to the grains and organic bond prior to curing the composite; and b) immersing said cured composite into a solvent and dissolving the dispersoid;

said abrasive segment being substantially free of dispersoid particles.

36. The segmented grinding wheel of claim 35 wherein said dispersoid comprises sugar, said solvent comprises water, and said organic bond matrix comprises phenolic resin.

37. The segmented grinding wheel of claim 33 wherein said organic bond matrix comprises a phenolic resin;

said abrasive grain comprises diamond having an average particle size ranging from about 0.5 to about 300 microns;

said thermally stable adhesive bond comprises an epoxy adhesive bond; and said interconnected porosity is formed is formed by adding a granular sugar dispersoid to the abrasive grains and organic bond prior to curing the composite and immersing the cured composite into water solvent and dissolving the dispersoid.

* * * * *